June 15, 1926.
E. D. TILLYER
1,588,783
OPHTHALMIC LENS
Filed August 2, 1922    2 Sheets-Sheet 1
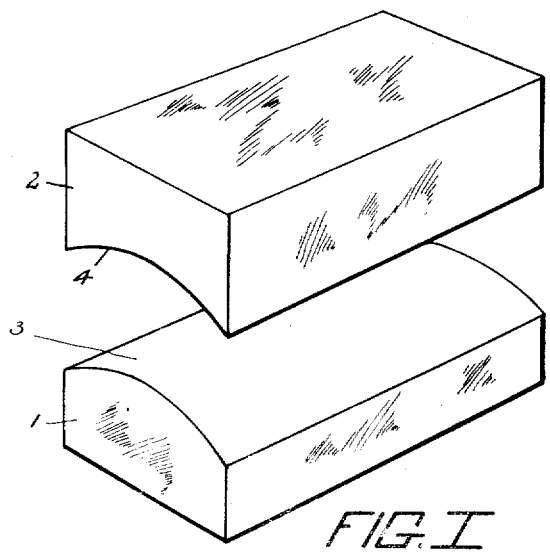
FIG. I
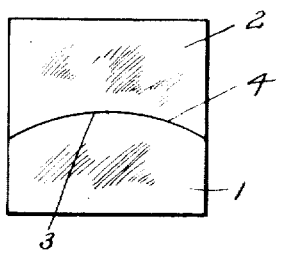
FIG. II
FIG. III
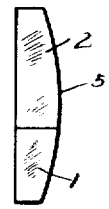
FIG. IV
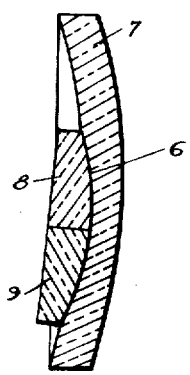
FIG. V
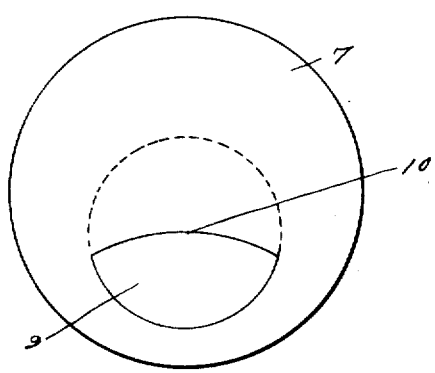
FIG. VI
INVENTOR
E. D. TILLYER
BY
H. H. Styll & H. K. Parsons
ATTORNEYS June 15, 1926.
E. D. TILLYER
1,588,783
OPHTHALMIC LENS
Filed August 2, 1922   2 Sheets-Sheet 2
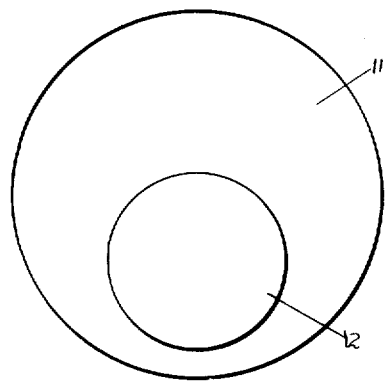
FIG. VII
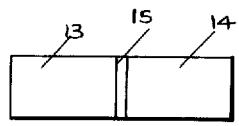
FIG. VIII
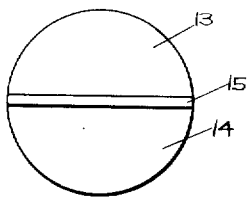
FIG. IX
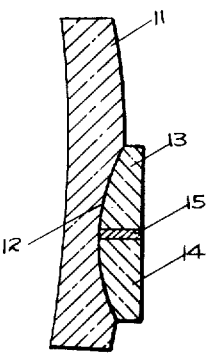
FIG. X
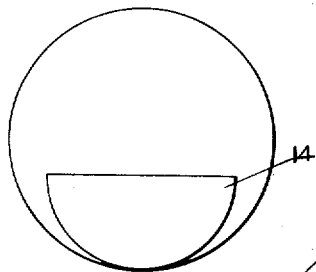
FIG. XI
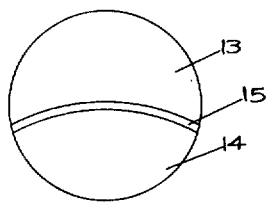
FIG. XII
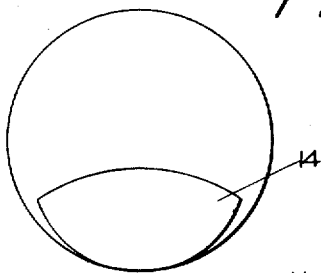
FIG. XIII
INVENTOR
E·D. TILLYER
BY
H. H. Styll  A. H. Parsons
ATTORNEYS Patented June 15, 1926.

1,588,783

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed August 2, 1922. Serial No. 579,205.

This invention relates to new and useful improvements in the manufacture of ophthalmic lenses and more particularly to what is known in the art as bifocal lenses.

The main object of the present invention is the provision of novel means for manufacturing the button for a two part lens and wherein this button when fused into position in the main lens blank will form what is known as a jumpless line of joinder between the button and the lens blank.

Another object of this invention resides in the construction of a button for bifocal lenses wherein a portion of the button is formed of the same type of glass as the body blank so that when the button is placed in position and both the button and blank fused together, one part of the button will become invisible leaving the remaining portion of the button visible and disposed in the proper position with respect to the main blank.

A further object of this invention is the manufacture of buttons for bifocal lenses wherein the buttons are formed by taking two bars of glass and an intermediate index of glass of different types, adhering the parts with the proper curve intermediate the bars so that several buttons can be cut from a finished bar and the said buttons then shaped to conform to the concave surface of the recess in the main blank, after which they are fused in place and ground down to the proper curvature.

In a great many cases the segment or button for a bifocal lens is formed of a single piece of glass but in a great many instances the segments or buttons are formed of more than one piece of glass and as a rule the line of joinder between these two pieces remains visible to a certain extent and it is, therefore, one of the objects of my invention to provide a connection between the two pieces whereby to reduce the visibility of the line of joinder to a minimum and also to reduce the reflection caused by joining two pieces of glass to form the button or segment.

With the above and other objects in view the invention consists in the novel features of construction, the combination and arrangement of parts hereinafter more fully set forth, pointed out in the claims and shown in the accompanying drawings, in which—

Figure I is a perspective view of two bars of glass formed to the proper shape, in order to carry out my invention.

Figure II is a transverse sectional view after the two bars of glass have been secured together.

Figure III is a side elevation of a single button cut from the finished bar shown in Figure II.

Figure IV is a side elevation of a button having one side rounded off to conform to the concave recess in the blank.

Figure V is a sectional view of the blank showing the button in position prior to grinding, and Figure VI is a plan view of a finished lens.

Figure VII is an elevation of a lens blank used in the manufacture of my improved lens.

Figure VIII is a side elevation of a modified button or reading segment used in connection with the blank illustrated in Figure VII.

Figure IX is a front elevation of the button shown in Figure VIII.

Figure X is a sectional view through the lens with the button in place prior to grinding.

Figure XI is an elevation of the lens after being ground to the desired curvature.

Figure XII is a front elevation illustrating another form of button, and

Figure XIII is a front elevation of a finished lens illustrating the use of the button shown in Figure XII.

In carrying out my invention I form two bars of glass generally indicated by the numerals 1 and 2, the bar 1 being preferably of flint glass and provided upon one face with a rounded surface as at 3. The bar 2 is preferably of crown glass having a concave face 4 which is adapted to comate with the round or convex surface 3 of the bar 1 so that the two bars may be readily secured together by having the convex surface of the bar 1 fitted into the concave portion 4 of the bar 2 and adhered by heating the glass to a softening point.

It will be apparent that prior to the formation of the curved surfaces 3 and 4 the bars are substantially rectangular shape in cross section. The surfaces 3 and 4 are then formed in one face of each of the bars and the two bars fixed together as illustrated in cross section in Figure II. In the construction of the completed bar shown in Figure II it is preferred to have the bar 1 formed of flint glass while the bar 2 is preferably of crown glass.

After the bars 1 and 2 have been heated and adhered together to form the construction shown in Figure II, the bar is cut up into individual pieces as shown in Figure III, said pieces being of the proper size in accordance with the type of button to have formed therefrom. In Figure IV it will be noted that one face of the button has been ground away to form a convex surface 5 on one face of the button adapted to be fitted into a concave recess 6 formed in the lens blank 7. In the construction of the blank 7 it is preferred to have the same form of crown glass or of substantially the same type of glass as the bar 2.

After the button has been placed in position within the recess 6 the blank and button are heated to a fusing point, the portion 8 of the button being of the same material or same index of refraction as the button 7. It will be entirely invisible after the button has been fused onto the blank, leaving the lower portion 9 of the button visible with an upper line of curvature as at 10. This section 9 of the button is visible due to the fact that it is of flint glass and of different index of refraction from the remaining portion of the button. It will be apparent that by having this curved line 10 in the finished product and by having the portion 8 of the button formed of the same type of glass as the blank it will reduce to a minimum the line of joinder between the button 9 and the main body of the blank.

In Figure VII I provide a blank 11 which is preferably of crown glass having the usual recess 12 for the reception of the reading portion or button which goes to make up the finished bifocal lens.

The button or segment which I have provided in this instance with an intermediate index is formed of three pieces of glass and in order to provide a complete button for the purpose set forth above I utilize a section of crown glass indicated at 13 and a section of flint glass as at 14. As a general rule these two pieces are fused together to form the completed button to be fitted within the recess 12 and there is usually a certain amount of visibility to the line of joinder between these two pieces of glass and in order to reduce this visibility to a minimum I fuse between the sections 13 and 14 what will be known as an intermediate section. In other words, we will take for example the fact that the section 13 is 1.52, and section 14 is 1.62, therefore the intermediate section will be 1.57 and may be either of crown or flint glass, the only necessary requirement being that the section 15 be an intermediate as set forth above.

In joining the sections 13 and 14 it will be apparent that either a straight line or curved line of joinder may be used, the two different types being fully illustrated in the accompanying drawings. After the three sections of the button have been securely fused together one side of the button is ground off as illustrated in Figure X and then placed within the recess 12 of the blank 11 where it then can be ground down together with the blank, to the proper prescription.

Calling attention to Figures XI and XII it will be noted that in one instance the upper line of the section 14 is disposed on a curve while the other instance is substantially horizontal, this line being determined by the line of connection between the sections 13 and 14 when fused together.

Attention is called to the fact that as section 13 is formed of crown glass the same as the main blank 11, this section will be rendered invisible when fused under the main blank thus leaving the flint section 14 visible for the reading portion of the lens.

From the above descriptions taken in connection with the accompanying drawings it will be apparent that by using an intermediate section between the two sections of glass which make up the button or reading portion of the lens, the vision of the line of joinder between the two sections of glass will be reduced to a minimum, and also reduces the reflection caused by the joint between the two sections.

It will be apparent from the above that I have provided a new and novel manner for forming bifocal lenses and one wherein the button for the lens can be manufactured and placed upon the market at a comparatively small cost. It will also be apparent that the construction of the button together with the fitting of the same onto the lens blank is extremely simple in construction and can be readily carried out.

I claim:

1. The process of making a blank for a reading portion of a fused multifocal lens, comprising surfacing one face of an elongated bar of glass, surfacing one face of another elongated bar of glass of different index of refraction from the first bar, fusing the two bars together on their surfaced faces and separating the fused bar into a plurality of sections on a line substantially normal to the fused faces, and of a thickness requisite to form a single blank for the reading portion of a fused multifocal lens.

2. The process of making a blank for the reading portion of a fused multifocal lens, comprising surfacing one face of an elongated bar of glass, surfacing one face of another elongated bar of glass of different index of refraction from the first, surfacing the two opposite faces of a third elongated bar of glass of index of refraction intermediate of the first two, fusing the three bars together on their surfaced faces, and separating the fused bar into a plurality of sections on lines substantially normal to the surfaced faces and of a thickness requisite to form a single blank for the reading portion of a fused multifocal lens.

3. The process of making a blank for the reading portion of a fused multifocal lens, comprising surfacing one face of an elongated bar of glass to a convex curve, surfacing another elongated bar of glass of different index of refraction from the first to a concave curve substantially contrageneric with the first curve, fusing the two bars together on their curved surfaced faces, and separating the fused bar into a plurality of sections on lines substantially normal to the surfaced faces of a thickness requisite to form a single blank for the reading portion of a fused multifocal lens.

EDGAR D. TILLYER.